Patented Oct. 2, 1934

1,975,447

UNITED STATES PATENT OFFICE

1,975,447

CHEWING GUM MATERIAL AND METHOD OF MAKING SAME

Franklin V. Canning, New York, N. Y., assignor to Sweets Laboratories, Inc., New York, N. Y., a corporation of New York No Drawing. Application January 30, 1930, Serial No. 424,717

9 Claims. (Cl. 99—11)

The present invention relates to making a chewing material such as a chewing gum base, which can readily be converted into chewing gum by the addition of any suitable flavoring material, sugary material, filler, medicating agent, and the like, with or without other materials if desired.

Numerous patents have been issued in which rubber in one form or another is used in the preparation of a chewing gum base. Patents have also been issued in which hydrogenated oil is employed, for example patents to Dunham, Numbers 1,534,929, 1,534,930 and 1,534,931. Patents have also been issued in which coumarone resin constitutes a component of the chewing gum, and no claim is made herein to novelty as to the use of any of the said ingredients.

In accordance with the present invention I do not start with raw rubber or vulcanized rubber, but with rubber latex or some other dispersion of rubber particles in an aqueous vehicle. As the preferred material for this purpose I employ raw rubber latex, which as well known is a liquid material containing usually about 30 or 35% of rubber hydrocarbon in the form of small particles. As is well known, rubber latex is an emulsion which is not entirely stable, but it can be rendered more or less stable by the addition thereto of a small percentage of ammonia, formaldehyde or equivalent material. Other stabilizing agents can be added which are not volatile with water, but in the present process I prefer to use latex to which ammonia or similar volatile material has been added as a stabilizing agent.

In carrying out the process I employ resinous material and particularly I preferably employ coumarone resin or a mixture of coumarone resins or a mixture of coumarone resin with other resinous materials, as the hardening agent. I preferably employ these in a finely powdered condition, for reasons as will appear below.

I also employ a hydrogenated oil, which may be hydrogenated peanut oil, hydrogenated soybean oil, hydrogenated cotton-seed, sesame, rape or other sweet vegetable oil, although other oils, suitably purified, may be employed. The hydrogenated oil is preferably of high melting point, say hydrogenated oil melting at about 55 to 67° C., this being ground to a fine powder.

The latex employed is first brought to between 20 and 25% rubber content by the addition of water, for example to 100 parts of the latex, 50 parts of water may be added. To the above quantity 25 to 90 parts of the pulverized resin and 35 to 75 parts of the pulverized hard hydrogenated oil are added, preferably at about room temperature, and the mixture is worked up on a suitable kneading machine, preferably at room temperature, into a relatively stiff paste. Another quantity of 20 to 85 parts of the pulverized resin and 35 to 75 parts of the pulverized hard hydrogenated oil are then added and the mixture is worked up on a suitable heated kneading machine, such as a Werner & Pfleiderer mixer, into a uniform pasty mass, which can then be transferred to a suitable kettle in which it is slowly heated up to about 115 to 125° C., while being well agitated, either continuously or intermittently, and held at above the boiling point of water for a sufficient time to drive off the water content of the latex and the added water. Care should be taken not to heat above 125° C., and preferably I employ somewhat lower temperatures than this. During the evaporation of the water from the mass, the ammonia or formaldehyde or similar volatile preservative in the latex likewise will evaporate.

There are several grades of coumarone resin and I have found that very satisfactory results may be secured by using hard coumarone resin and soft coumarone resin together, these being suitably blended and if necessary purified, then being cooled and pulverized. To the resin may be added a small amount, say about 3% of powdered cocoa bean to improve the working properties of the mass, and to improve the chewing qualities of the final gum, in addition to the flavor conferred thereby. The 3% above referred to is based on the weight of the final chewing gum base, and this may amount to about 8 or 10% of the weight of the resin.

During and after the expulsion of the water of the latex, the mass is agitated and preferably kneaded for a considerable time to improve the masticating properties of the chewing gum base.

The proportions of the materials can vary between rather wide limits, the resin being a hardening agent and the hydrogenated oil being a softening agent, and the rubber of the latex furnishing a certain degree of springiness to the product.

The chewing gum base when prepared as above indicated can be kept for a long time if desired before being made up into chewing gum, and the finished gum also can be kept or stored for long intervals. It is sometimes advisable to add other fillers which are insoluble in the above mentioned constituents, but these being in a finely divided form, such as an impalpable powder, will blend readily into the mass.

In some cases it is advisable to perform the entire evaporation of the water in the kneading machine, which is ventilated for the purpose of allowing a current of atmospheric air to pass therethrough. The kneading may be continued for about five hours, at say 120° C., after the water has been apparently completely liberated and the mass is apparently dry.

I have referred to using 45 to 175 parts in all of the pulverized resin, and for gum of ordinary grades of consistency I prefer to use about 90 to 120 parts of the resin. Likewise while I have referred to using 70 to 150 parts in all of the hydrogenated hard oil, 120 to 140 parts give most satisfactory results for ordinary consistency.

A point of great commercial utility lies in the fact that the latex is a liquid and can readily be passed through a fine strainer to remove all particles of bark, dirt and the like, and latex is usually much purer than ordinary crepe rubber or other crude forms of rubber, and the separation of impurities from rubber is far more difficult than the separation of the same impurities from latex. I am aware that heretofore it has been proposed to employ other kinds of latex in the manufacture of chewing gum, but since latex itself is a more or less complex material one would expect that the use of rubber latex in such mixtures as above referred to would introduce considerable difficulties, and I call attention to the fact that probably other constituents of the latex, besides the rubber hydrocarbon are actually used in the process, or at least they certainly do pass into the chewing gum base, but experience has shown that they do no harm therein.

For the purpose of more completely illustrating the invention and without restricting the invention thereto, the following example of the manufacture of a chewing gum base in accordance with the present invention is given:—

Using a steam jacketed Werner & Pfleiderer mixing kettle, mixing the following ingredients as described below without applying heat and at room temperature.

To 100 parts rubber latex of 35% rubber content, add 50 parts of water and start the agitators. Then add slowly 7 parts of cocoa powder and 85 parts of coumarone resin (pulverized) and follow with 105 parts of powdered hydrogenated vegetable oil.

In the process the rubber latex changes from a liquid to a paste and as more solids are added finally becomes granular in form. The absorbed moisture is then driven off by turning on the steam and slowly raising the temperature in the kettle to about 110° C. Keep the agitators going throughout the process. The heat softens the resin and the hydrogenated oil and the action of the agitators forms the mass into a plastic, homogeneous mixture. After this point has been reached continue temperature and agitation for about two hours and remove product from the kettle.

I claim:—

1. A process of making chewing gum material which comprises adding pulverized resinous material including coumarone resin and pulverized hard hydrogenated oil, to uncoagulated latex, in such proportions as to form a paste, and well mixing said materials, thereafter adding more resinous material and hard oil and working the mixture while heating to well above the boiling point of water, and holding at above the boiling point of water, while working the mass, until a substantially dry mixture has been formed.

2. In the process of claim 1, the step of diluting the latex, before the first addition mentioned, with about one-fourth to three-fourths of its bulk of water.

3. A process as in claim 1, in which for 100 parts of rubber latex, about 45 to 175 parts of resin and about 70 to 150 parts of hard hydrogenated oil are added, in the two steps mentioned.

4. A process as in claim 1, in which, for 100 parts of rubber latex, about 100 to 120 parts of the resin and about 120 to 140 parts of the hard hydrogenated oil are added.

5. A process of making chewing gum material which comprises adding pulverized resinous material including coumarone resin and pulverized hard hydrogenated oil, to an intimate dispersion of particles of rubber hydrocarbon in an aqueous liquid vehicle, in such proportions as to form a paste, and well mixing said materials, thereafter adding more resinous material and hard oil and working the mixture while heating to well above the boiling point of water, and holding at above the boiling point of water, while working the mass, until a substantially dry mixture has been formed.

6. A process of making chewing gum material which comprises adding pulverized resinous material including coumarone resin and pulverized hard hydrogenated oil, to uncoagulated rubber latex, in such proportions as to form a paste, and well mixing said materials, thereafter adding more resinous material and hard oil and working the mixture while heating to well above the boiling point of water, and holding at above the boiling point of water, while working the mass, to drive off water from the mass.

7. A substantially dry homogeneous mixture of the composite solids of rubber latex, coumarone resin and hydrogenated oil in such proportions as to form a chewing gum base, substantially freed of the water content of the latex.

8. A dried mixture containing the composite solids of 100 parts of rubber latex, about 45 to 175 parts of resin including coumarone resin and about 70 to 150 parts of hard hydrogenated oil, such mixture being adapted for use in chewing gum.

9. In the manufacture of chewing gum base containing rubber hydrocarbon, the step of adding all of the rubber in the form of rubber latex.

FRANKLIN V. CANNING.